May 12, 1953        H. G. BECK        2,637,880
SELF-SEALING WINDOW STRIP
Filed Nov. 2, 1949
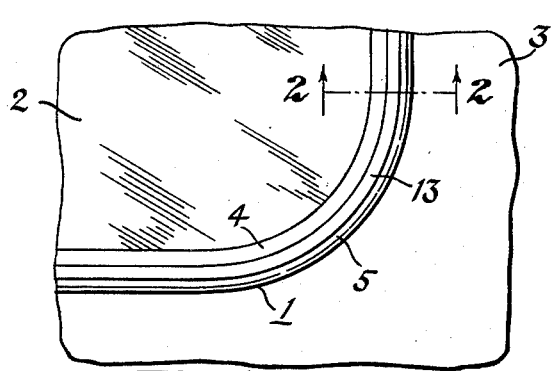
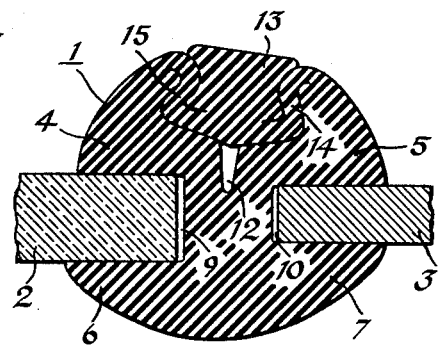
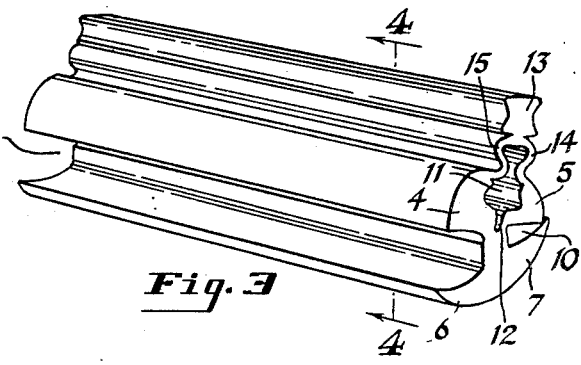
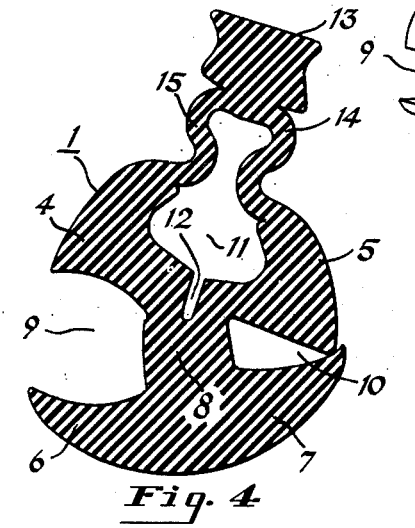
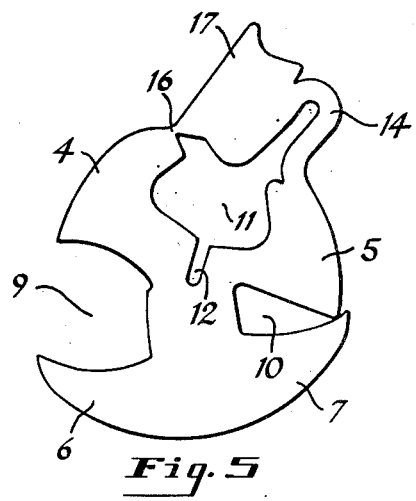
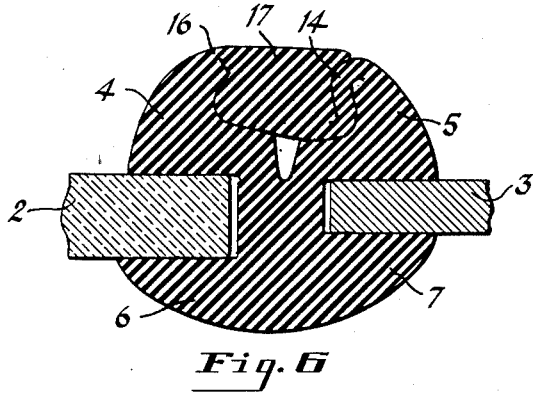
INVENTOR
Howard G. Beck
BY Evans & McCoy
ATTORNEYS Patented May 12, 1953

2,637,880

UNITED STATES PATENT OFFICE 2,637,880

SELF-SEALING WINDOW STRIP

Howard G. Beck, Wabash, Ind., assignor to The General Tire and Rubber Company, Akron, Ohio, a corporation of Ohio Application November 2, 1949, Serial No. 125,075

3 Claims. (Cl. 20—56.4)

This invention relates to improvements in flexible mountings of rubberlike material for sealing and glazing panels together and in particular to mountings for use on windshields and windows of motor vehicles.

Mountings of rubberlike material comprising a linear mounting with opposite grooves therein and a separate locking strip or wedge element are now in common use. The difficulties with mountings of this type are that the wedge element tends to deform in cross-sectional shape relative to the body of the mounting as it is pressed into locking position and that considerable time is lost in aligning the locking element with the mounting. The tendency of a separate locking element to deform can be compensated for by making this element of a harder rubber but frequently it is desirable to utilize the increased resilience of a very soft or lightly compounded rubber. Up to the present time no means has been found to facilitate assembly of the mounting itself with such a resilient locking strip.

One object of the present invention is to provide a linear flexible mounting which is rapidly and facilely assembled even though the locking member is of relatively easily deformable rubbery material.

Another object of this invention is to provide a mounting which can be extruded and supplied in one piece for immediate assembly.

In case of breakage of a glass panel fastened in an opening by a locked strip of flexible material, much difficulty is often had in removing the locking strip in order to replace the glass. This is particularly the case when the assembly has been in place for substantial periods and the parts are almost bonded together.

Still another object is to provide a method of incorporating window glass into openings in panels by which the window glass is firmly and resiliently held in place.

It is another object of the present invention to provide a flexible seal for joining adjacent panel edges together which seal may be readily opened by suitably injecting compressed air into a cavity in the seal.

Other objects will be apparent from the following description of the invention as illustrated by the accompanying drawings, in which like parts are denoted by like numerals of reference throughout the several views.

Fig. 1 is a front view of two panels joined together by this mounting showing the flexibility of the mounting and its neat appearance. In this case, the central panel is an automobile window glass and the outer panel is the body of a motor vehicle.

Fig. 2 is an enlarged cross-section on line 2—2 of Fig. 1 showing the mounting as assembled firmly holding the edge portions of the adjoining panels.

Fig. 3 is a perspective view of the linear mounting of this invention as extruded and supplied for assembly.

Fig. 4 is an enlarged cross-section on line 4—4 showing one form of the mounting in the unlocked or open position.

Fig. 5 is a cross-sectional view showing another form of the mounting in the unlocked or open position.

Fig. 6 is a cross-sectional view of the mounting of Fig. 5 as locked and assembled with two panels.

I have discovered that assembly of this type of mounting is greatly facilitated by making the locking strip integral with the body of the mounting. In other words, I integrally hinge the locking element with the body of the mounting so that the element is always in alignment with the mounting and ready to be pressed into the locked position. This eliminates much fussing with a separate locking element and reduces considerably assembly time. Furthermore, it provides a mounting which is easily extruded and supplied at the assembly location in one piece. This reduces production and handling costs.

The mounting strip 1 is shown in Fig. 1 as assembled with two panels in this case one panel being a window glass 2 and the other panel being a car body 3. This mounting can be used to join many sizes and types of panel edges. At present, the principal use is in joining automobile windows to the automobile body and so that has been shown. This figure illustrates the flexibility of the strip, the attractive appearance of it when finally assembled, and shows generally the relationship with the panels. More detail is shown in the enlarged sectional view of Fig. 2 in which the window glass 2 or lefthand panel and the car body 3 or righthand panel are firmly held in place by the sealing flanges 4, 5, 6, and 7, of the mounting which flanges are respectively connected by a connecting portion 8 (Fig. 4) into the general shape of a horizontal H section. In the unassembled or open form of Fig. 4, the flanges 4 and 6 form panel receiving groove or channel 9 and the flanges 5 and 7 form panel receiving groove or channel 10. The panel edges are fitted into these grooves prior to fitting or locking the mounting in place. The grooves 9 and 10 should be formed so as to receive the panel edges which fit into them. The flanges or body extensions 4, 5, 6, and 7 have concave inner faces so that when they grip the panels 2 and 3, the outer edges of the flanges will exert as much or more gripping force than the inner edges and provide a firm and watertight seal.

The flange portions 6 and 7 on the under side of the median plane through the grooves 9 and 10 are movable toward each other only with considerable difficulty occasioned by compression of the rubberlike material therebetween. These flanges consequently tend to resist any movement relative to each other. Flanges 4 and 5 on the other side of the median plane are movable toward each other relatively freely and they permit the grooves 9 and 10 to open to a considerable extent when the mounting is in the unlocked position of Fig. 4. This movement is allowed by the tubular hollow or longitudinal cavity 11 with a V-shaped extension 12 between the flanges 4 and 5. In other words, the flanges 4 and 5 move toward each other easily because they have no mass of rubberlike material between them to resist this movement. The V-shaped extension 12 of the hollow facilitates this movement by eliminating material from the connecting portion 8 of the mounting 1.

In accordance with the present invention, a filler or locking element 13 is integrally formed with the mounting and connected therewith by linear hinges or connecting portions 14 and 15 of relatively thin flexible rubberlike material to the two sides of the hollow or cavity 11 respectively from the inner surface of the locking element 13. At least one of the linear hinges 14 is transversely elongated to provide a flexible strip having a width at least about equal to the transverse thickness of the locking element 13. The hinges 14 and 15 cooperate with the locking element 13 and the portion of the body of the seal forming wall portions of the hollow 11 to form a tube that permits the seal to be unlocked by compressed air. The hinges 14 and 15 are sufficient lengths to permit the locking element to be removed from between the flanges 4 and 5. As the locking element is pushed into the tubular hollow or into the locked position, the elongated hinges fold in before it and guide or position it and then ultimately take its general shape as shown in Fig. 2. The locking element or linear spreader 13 is so formed that after the panels 2 and 3 have been fitted into the panel receiving grooves 9 and 10, element 13 and the hinges 14 and 15 can be pressed into the hollow 11 to fill up the hollow with a bulk of rubberlike material and to force the flanges 4 and 5 down upon the panels 2 and 3 and hold them in that position. The sides of the hollow 11 are shaped to receive the locking element 13 and have a narrow outer portion and a wide inner portion so that in effect the hollow has overhanging lips on the outer surface which tend to hold the locking element in place in the hollow.

Correspondingly, the locking element 13 is flared at the inner and outer surfaces as shown in Fig. 4 to fit into the hollow. When it is forced into the hollow the lower wide portion of the wedge fits into the wide inner section of the hollow 11 as shown in Fig. 2 and the outer flared portion of the locking element covers the elongated hinge structures or side hinges 14 and 15 as folded inside of the locking element 13 and shown in Fig. 2. This provides a neat outer seal. The pressure of the flanges 4 and 5 resting on the panels 2 and 3 and thrusting back at the wedge 13 also tend to hold it in place.

The locking element can be forced into the hollow by thumb pressure or by a round bottomed tool (not shown).

The modification of Fig. 5 is similar to that of Fig. 4 except that the locking element 17 is integrally hinged or joined directly at 16 along the length of one side of the body of the mounting by a short hinge to provide a localized pivot instead of having an elongated sheet-like connector or flap structure on both sides. The other connection to the locking element is a flap or sheet-like connector 14 as shown in Fig. 5. The localized pivot 16 gives much greater relative longitudinal rigidity between the body and the locking element. The locking element 17 is made larger in cross-section along the left side to account for the lack of a connecting flap portion and the flap portion 14 folds under the wedge when assembled as shown in Fig. 6. The advantage of this form of my invention is that the wedge 17 can be forced into place by a leverlike action pivoting on the hinge point 16 and in so doing requires less force than that required to locate the modification shown in Fig. 2. Also, since the locking element 17 is hinged to the body at 15 it has an extra point of attachment to the mounting 1 and it is not as easily disengaged from the hollow 11 once in position.

One advantage of the structure of this invention is that the side hinges guide and align the locking element as it is fitted into place and thus facilitate assembly. The only tool required is a simple round-bottomed one to run over the locking element to force it in place. The side hinges themselves as they are forced downward give a spreading action to the adjacent sidewalls of the mounting and eliminate any necessity of use of a special spreading tool. Also these integral hinges restrain lengthwise elongation of the locking element relative to the mounting strip and in this way eliminate a diminishing of the cross-sectional size of the locking element and insure a satisfactory fit. This allows the locking element to be made of the same rubber as the mounting and does not require it to be of a harder rubber with the consequent reduction in flexibility.

A further advantage as aforesaid, is that in repairing or removing this mounting from the panels the seal can be instantly opened up or unlocked by the use of an air injection needle. The needle is worked or inserted into the mounting until it penetrates the inner hollow surface. Then a blast of compressed air is shot through the needle into the hollow and the resulting pressure within the hollow instantly pops open or unlocks the mounting. Thus, a garage can rapidly repair a broken automobile window with nominal labor cost.

Both of the mountings shown have a uniform cross-section and consequently may be formed by extrusion in strip form and then cured or vulcanized. The delivered strip is similar to that shown in Fig. 3. The mountings should be made of a medium hard rubber.

Although the invention may be employed in various ways, only preferred embodiments have been illustrated and described. Other embodiments may be made within the invention as provided by the patent statutes.

What I claim is:

1. A flexible linear mounting of rubberlike material for joining adjacent panel edges characterized by having a body of uniform cross-section with two spaced and generally opposite linear grooves therein, a tubular hollow in said body between said grooves, and a locking element on one side connected to a relatively narrow portion which is in turn connected with said mounting body along one side of the outer edge of the body of the mounting adjacent the hollow and on the other side connected to a flap portion running from said other side of the outer edge of the body of the mounting adjacent the hollow to the inner bottom of the locking element, said locking element, said flap portion, said hinge portion and said hollow being proportioned so that said locking element and said flap and hinge portions can be sprung into said hollow to thereby compress portions of the body of the mounting around edge portions of panels in said grooves and to hold said edge portions firmly therein and to cause said locking element to be held and locked in said hollow by resulting pressure exerted from the body of the mounting pressing against it.

2. A flexible linear mounting of rubberlike material for joining adjacent panel edges characterized by having a body of uniform cross-section with two spaced and generally opposite linear grooves therein, a hollow in said body between said grooves, said hollow having relatively narrow overhanging outer portions and wide undercut inner portions, and a locking element hingedly integral with said body along one outer edge of the body of the mounting adjacent the hollow and integral with said body along the outer edge of the body adjacent the hollow by means of a flap connection running from said other outer edge of the body of the mounting adjacent the hollow to the inner bottom of the locking element, said locking element having a flared inner portion and a flared outer portion and a relatively narrow central portion, said locking element, said connections, and said hollow being proportioned so that said locking element and said connections can be sprung into said hollow to thereby compress portions of the body of the mounting around edge portions of panels in said grooves to hold said edge portions firmly therein and to cause said locking element to be held and locked in said hollow by resulting pressure exerted from the body of the mounting pressing against it.

3. A flexible linear mounting of rubberlike material for joining adjacent panel edges characterized by having a body of uniform cross-section with two spaced grooves disposed therein, a longitudinal hollow in said body portion between said two grooves and disposed generally on one side of a plane passing through the midpoints of the base of said grooves, and a locking element connected from one of its outside corners to said body portion along one of the edges of said longitudinal hollow and from its bottom to a flap portion which is in turn connected to the other edge of said longitudinal hollow, said opening, said locking element, and said flap portion forming an air-tight tube, and being so proportioned that said opening tightly receives said locking element when the side walls of said panel-edge-receiving grooves are spaced sufficiently to receive suitable panel edges, said locking element so fitting into said hollow that the rubberlike material of said body closely adjacent the edges of the panel edge-receiving grooves is compressed against the portions of a panel in said grooves and said locking element is maintained in said opening by the body of the mounting pressing upon it.

HOWARD G. BECK.

References Cited in the file of this patent

UNITED STATES PATENTS

| Number | Name | Date |
|---|---|---|
| 2,189,138 | Eichner | Feb. 6, 1940 |
| 2,288,329 | Smith | June 30, 1942 |
| 2,430,873 | Haas | Nov. 18, 1947 |
| 2,492,566 | Geyer | Dec. 27, 1949 |